US012573275B2

(12) United States Patent
Imai et al.

(10) Patent No.: US 12,573,275 B2
(45) Date of Patent: Mar. 10, 2026

(54) ABNORMALITY DETERMINATION METHOD, ABNORMALITY DETERMINATION APPARATUS, ABNORMALITY DETERMINATION SYSTEM, AND NON-TRANSITORY COMPUTER-READABLE MEDIUM

(71) Applicant: NEC Corporation, Tokyo (JP)

(72) Inventors: Ryusuke Imai, Tokyo (JP); Akira Tsuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 34 days.

(21) Appl. No.: 18/705,019

(22) PCT Filed: Nov. 17, 2021

(86) PCT No.: PCT/JP2021/042232

§ 371 (c)(1),
(2) Date: Apr. 26, 2024

(87) PCT Pub. No.: WO2023/089692

PCT Pub. Date: May 25, 2023

(65) Prior Publication Data

US 2024/0420553 A1 Dec. 19, 2024

(51) Int. Cl.

*G08B 13/186* (2006.01)
*G08B 13/16* (2006.01)
*G08B 29/18* (2006.01)

(52) U.S. Cl.

CPC ....... *G08B 13/186* (2013.01); *G08B 13/1672* (2013.01); *G08B 29/185* (2013.01)

(58) Field of Classification Search

CPC . G08B 13/186; G08B 13/1672; G08B 29/185
See application file for complete search history.

(56) References Cited

U.S. PATENT DOCUMENTS 5,491,572 A * 2/1996 Ohara ................ H04B 10/2589 370/242
11,914,399 B2 * 2/2024 Kojima .................. G01H 9/004
(Continued)

FOREIGN PATENT DOCUMENTS

JP 2005-349892 A 12/2005
JP 2011-227619 11/2011
(Continued)

OTHER PUBLICATIONS

International Search Report for PCT Application No. PCT/JP2021/042232, mailed on Feb. 1, 2022.

*Primary Examiner* — John A Tweel, Jr.
(74) *Attorney, Agent, or Firm* — Sughrue Mion, PLLC

(57) ABSTRACT

An abnormality determination method capable of contributing to improvement of abnormality determination accuracy is implemented. The abnormality determination method according to an example embodiment of the present disclosure includes: setting a first area for an optical fiber sensor to attempt to detect an abnormality; setting a second area in which detection of an abnormality is invalidated when the abnormality is detected in the first area; setting an invalid time zone in which detection of an abnormality is invalidated when the abnormality is detected in the first area; and determining, when an abnormality is detected in the first area, that no abnormality has occurred in the first area in a case where a position where the abnormality is detected is inside the second area and a time when the abnormality is detected is within the invalid time zone.

10 Claims, 11 Drawing Sheets

(56) References Cited

U.S. PATENT DOCUMENTS

| | | | | |
|---|---|---|---|---|
| 2019/0197856 | A1* | 6/2019 | Gracin | G08B 25/009 |
| 2023/0070029 | A1* | 3/2023 | Iwano | G08B 13/189 |

FOREIGN PATENT DOCUMENTS

| | | | | | |
|---|---|---|---|---|---|
| JP | 2011227619 | A * | 11/2011 | | |
| JP | 2019-071578 | | 5/2019 | | |
| JP | 2019071578 | A * | 5/2019 | | |
| WO | 2020/255358 | | 12/2020 | | |
| WO | 2021/024388 | | 2/2021 | | |
| WO | WO-2021171593 | A1 * | 9/2021 | | G01D 5/353 |

* cited by examiner

ABNORMALITY DETERMINATION METHOD, ABNORMALITY DETERMINATION APPARATUS, ABNORMALITY DETERMINATION SYSTEM, AND NON-TRANSITORY COMPUTER-READABLE MEDIUM

This application is a National Stage Entry of PCT/JP2021/042232 filed on Nov. 17, 2021, the contents of all of which are incorporated herein by reference, in their entirety.

TECHNICAL FIELD

The present disclosure relates to an abnormality determination method, an abnormality determination apparatus, an abnormality determination system, and a non-transitory computer-readable medium.

BACKGROUND ART

In recent years, a technology for detecting an abnormality by using an optical fiber sensor has been implemented. For example, an intrusion detection system of Patent Literature 1 determines that an intruder is present in a track when a power fluctuation of an optical fiber sensor exceeds a preset threshold.

At this time, the intrusion detection system of Patent Literature 1 determines whether or not a position detected by the optical fiber sensor coincides with a position of track maintenance work, and when the position coincides with the position of the track maintenance work, it is estimated that the optical fiber sensor reacts to a track maintenance worker, and it is determined that there is no intruder into the track. In this way, the intrusion detection system of Patent Literature 1 suppresses erroneous abnormality determination by the optical fiber sensor.

CITATION LIST

Patent Literature

Patent Literature 1: Japanese Unexamined Patent Application Publication No. 2005-349892

SUMMARY OF INVENTION

Technical Problem

The intrusion detection system of Patent Literature 1 suppresses erroneous abnormality determination by the optical fiber sensor only based on whether or not the position detected by the optical fiber sensor and the position of the track maintenance work coincide with each other. Therefore, there is room for further suppressing erroneous determination and improving abnormality determination accuracy.

An object of the example embodiments disclosed in the present specification is to provide an abnormality determination method, an abnormality determination apparatus, an abnormality determination system, and a non-transitory computer-readable medium that contribute to solving the problem. It should be noted that the object is merely one of a plurality of objects to be achieved by a plurality of example embodiments disclosed herein. Other objects or problems and novel features will be apparent from the description of the present specification or the accompanying drawings.

Solution to Problem

An abnormality detection method according to an aspect of the present disclosure includes:

setting a first area for an optical fiber sensor to attempt to detect an abnormality;

setting a second area in which detection of an abnormality is invalidated when the abnormality is detected in the first area;

setting an invalid time zone in which detection of an abnormality is invalidated when the abnormality is detected in the first area; and determining, when an abnormality is detected in the first area, that no abnormality has occurred in the first area in a case where a position where the abnormality is detected is inside the second area and a time when the abnormality is detected is within the invalid time zone.

A non-transitory computer-readable medium according to an aspect of the present disclosure stores an abnormality determination program for causing a computer to execute processing of:

setting a first area for an optical fiber sensor to attempt to detect an abnormality;

setting a second area in which detection of an abnormality is invalidated when the abnormality is detected in the first area;

setting an invalid time zone in which detection of an abnormality is invalidated when the abnormality is detected in the first area; and determining, when an abnormality is detected in the first area, that no abnormality has occurred in the first area in a case where a position where the abnormality is detected is inside the second area and a time when the abnormality is detected is within the invalid time zone.

An abnormality determination apparatus according to an aspect of the present disclosure includes:

state information acquisition means for acquiring state information of an inside of a first area detected by an optical fiber sensor;

map information acquisition means for acquiring map information of the first area;

time information acquisition means for acquiring current time information;

invalidation information acquisition means for acquiring information indicating a second area in which detection of an abnormality is invalidated when the abnormality is detected in the first area and information indicating an invalid time zone in which detection of an abnormality is invalidated when the abnormality is detected in the first area; and determination means for determining whether or not an abnormality has occurred in the first area based on state information of the inside of the first area, in which when an abnormality is detected in the first area, the determination means determines that no abnormality has occurred in the first area in a case where a position where the abnormality is detected is inside the second area and a time when the abnormality is detected is within the invalid time zone.

An abnormality determination system according to an aspect of the present disclosure includes:

the abnormality determination apparatus described above;

the optical fiber sensor disposed in such a way as to surround the first area; and setting means for setting the first area, the second area, and the invalid time zone.

Advantageous Effects of Invention

According to the above aspect, it is possible to implement an abnormality determination method, an abnormality determination apparatus, an abnormality determination system, and a non-transitory computer-readable medium that can contribute to improvement of abnormality determination accuracy.

EXAMPLE EMBODIMENT

Hereinafter, best modes for carrying out the present disclosure will be described with reference to the accompanying drawings. However, the present disclosure is not limited to the following example embodiments. In order to clarify description, the following description and drawings are simplified as appropriate.

First Example Embodiment

An abnormality determination apparatus and an abnormality determination method according to the present example embodiment are suitable, for example, in a case where an abnormality in a facility is detected by an optical fiber sensor. First, the minimum configuration of the abnormality determination apparatus according to the present example embodiment will be described.

Figure 1:
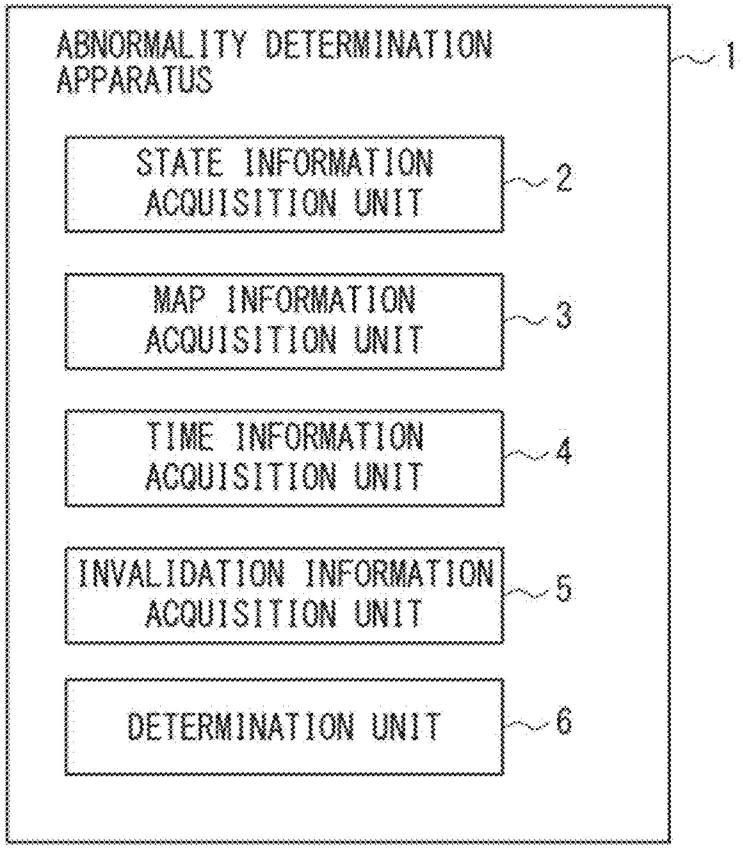
FIG. 1 is a block diagram illustrating a minimum configuration of an abnormality determination apparatus according to a first example embodiment.

FIG. 1 is a block diagram illustrating the minimum configuration of the abnormality determination apparatus according to the present example embodiment. As illustrated in FIG. 1, an abnormality determination apparatus 1 includes a state information acquisition unit 2, a map information acquisition unit 3, a time information acquisition unit 4, an invalidation information acquisition unit 5, and a determination unit 6.

The state information acquisition unit 2 acquires, for example, state information of the inside of a first area of a facility that is an abnormality detection target, the state information being detected by an optical fiber sensor disposed to surround the first area. The map information acquisition unit 3 acquires map information of the first area.

The time information acquisition unit 4 acquires current time information. The invalidation information acquisition unit 5 acquires information indicating a second area in which detection of an abnormality is invalidated when the abnormality is detected in the first area, and information indicating an invalid time zone in which detection of an abnormality is invalidated when the abnormality is detected in the first area.

The determination unit 6 determines whether or not an abnormality has occurred in the first area based on the state information of the inside of the first area. At this time, when an abnormality is detected inside the first area, the determination unit 6 determines that no abnormality has occurred in the first area in a case where a position where the abnormality is detected is inside the second area and a time when the abnormality is detected is within the invalid time zone.

Figure 2:
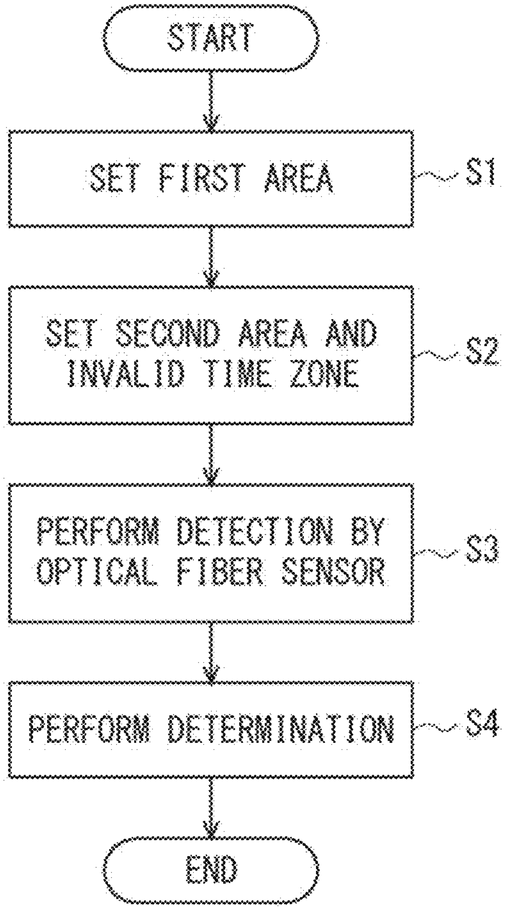
FIG. 2 is a flowchart illustrating a flow of an abnormality determination method according to the first example embodiment.

Next, a flow of an abnormality determination method according to the present example embodiment will be described. FIG. 2 is a flowchart illustrating the flow of the abnormality determination method according to the present example embodiment. First, an inspector sets the first area for the optical fiber sensor to attempt to detect an abnormality (S1).

Next, the inspector sets the second area in which detection of an abnormality is invalidated when the abnormality is detected in the first area, and sets an invalid time zone in which detection of an abnormality is invalidated when the abnormality is detected in the first area (S2).

Next, the optical fiber sensor attempts to detect an abnormality inside the first area (S3). Then, when an abnormality is detected in the first area, the determination unit 6 determines that no abnormality has occurred in the first area in a case where a position where the abnormality is detected is inside the second area and a time when the abnormality is detected is within the invalid time zone (S4).

As described above, in the abnormality determination apparatus 1 and the abnormality determination method according to the present example embodiment, occurrence of an abnormality inside the first area is determined in consideration of not only a position where the abnormality is detected but also a time when the abnormality is detected. Therefore, as compared with the intrusion detection system of Patent Literature 1, it is possible to suppress erroneous abnormality determination and contribute to improvement of abnormality determination accuracy.

Second Example Embodiment

Figure 3:
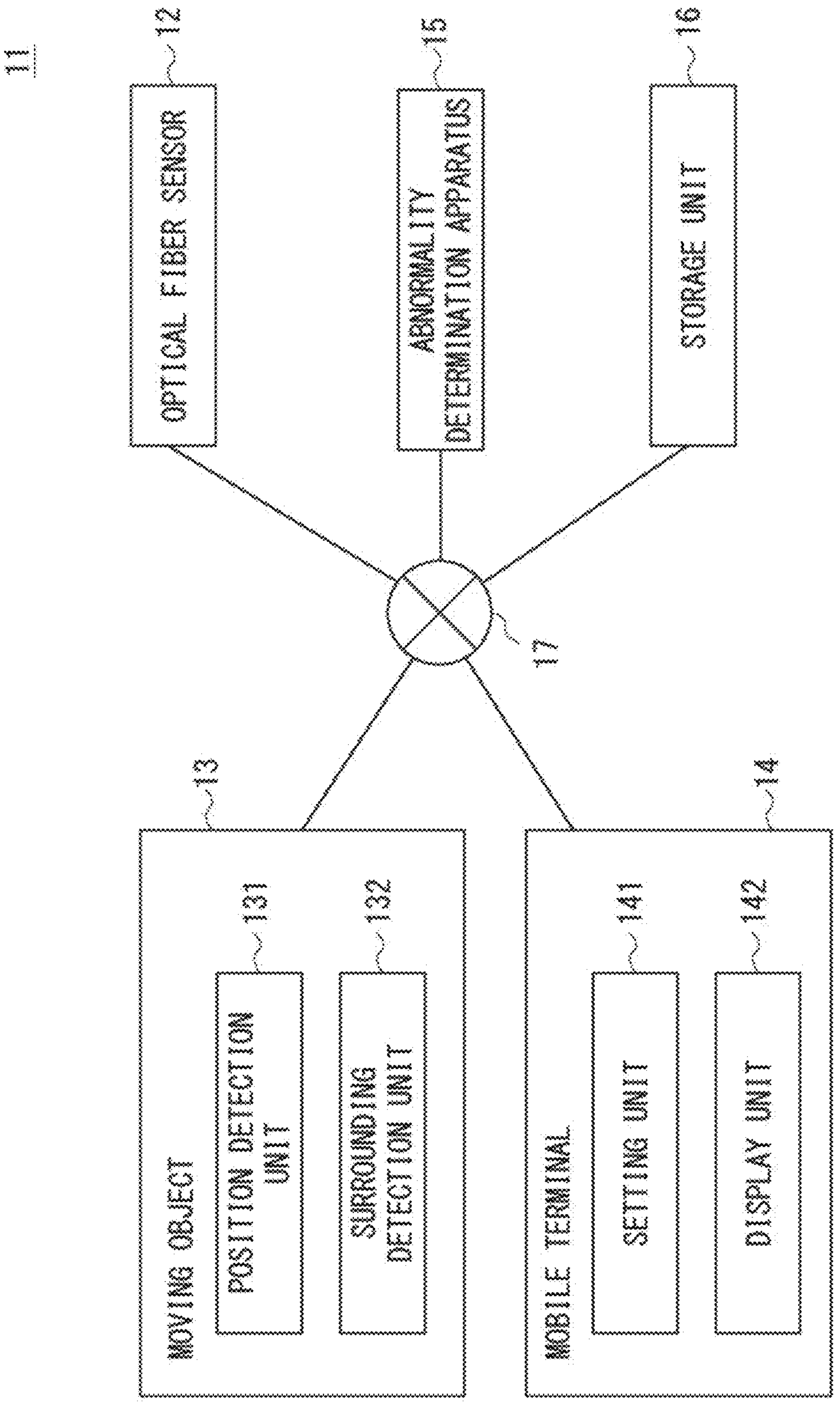
FIG. 3 is a block diagram illustrating a configuration of an abnormality determination system according to a second example embodiment.
Figure 4:
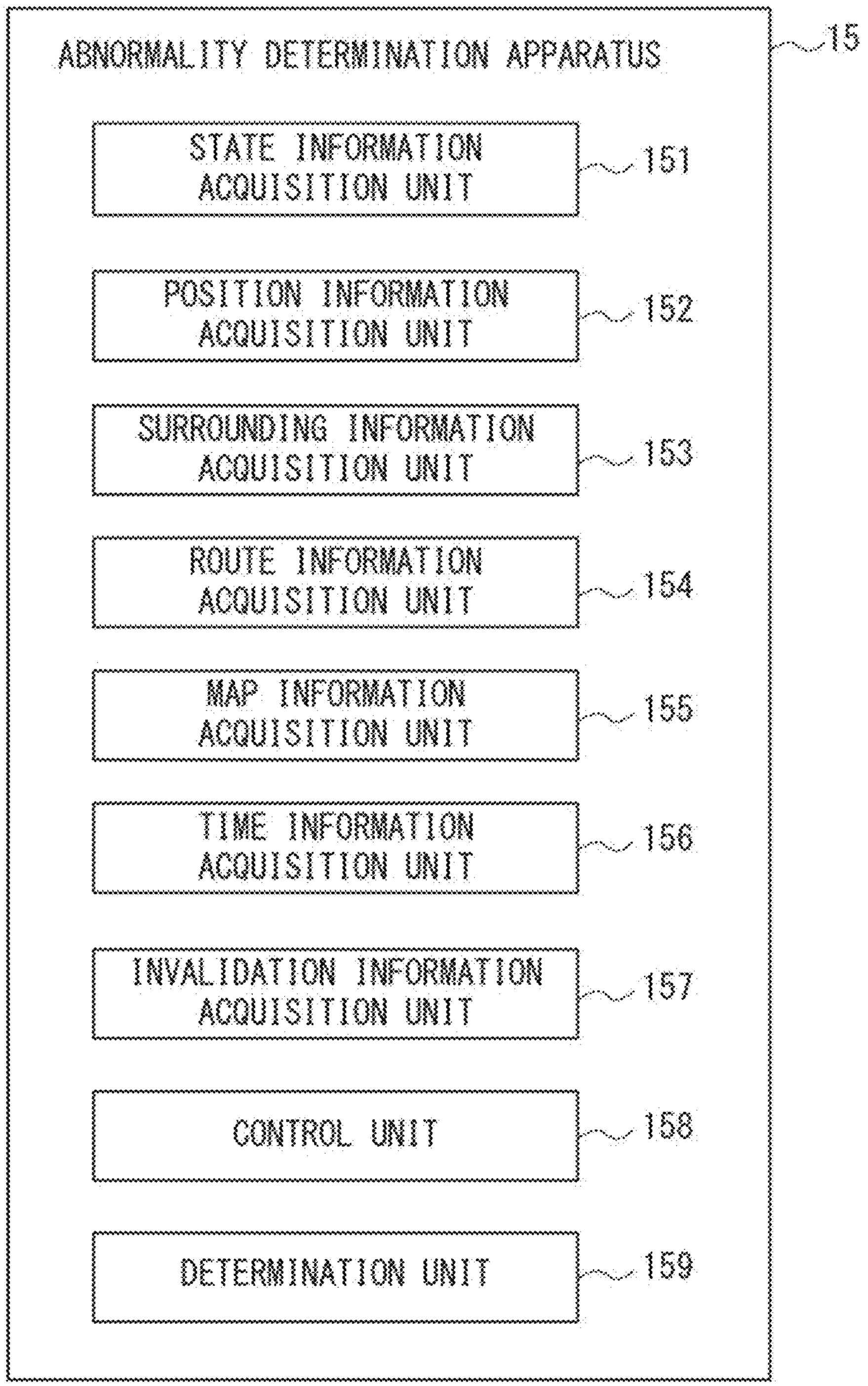
FIG. 4 is a block diagram illustrating a configuration of an abnormality determination apparatus according to the second example embodiment.
Figure 5:
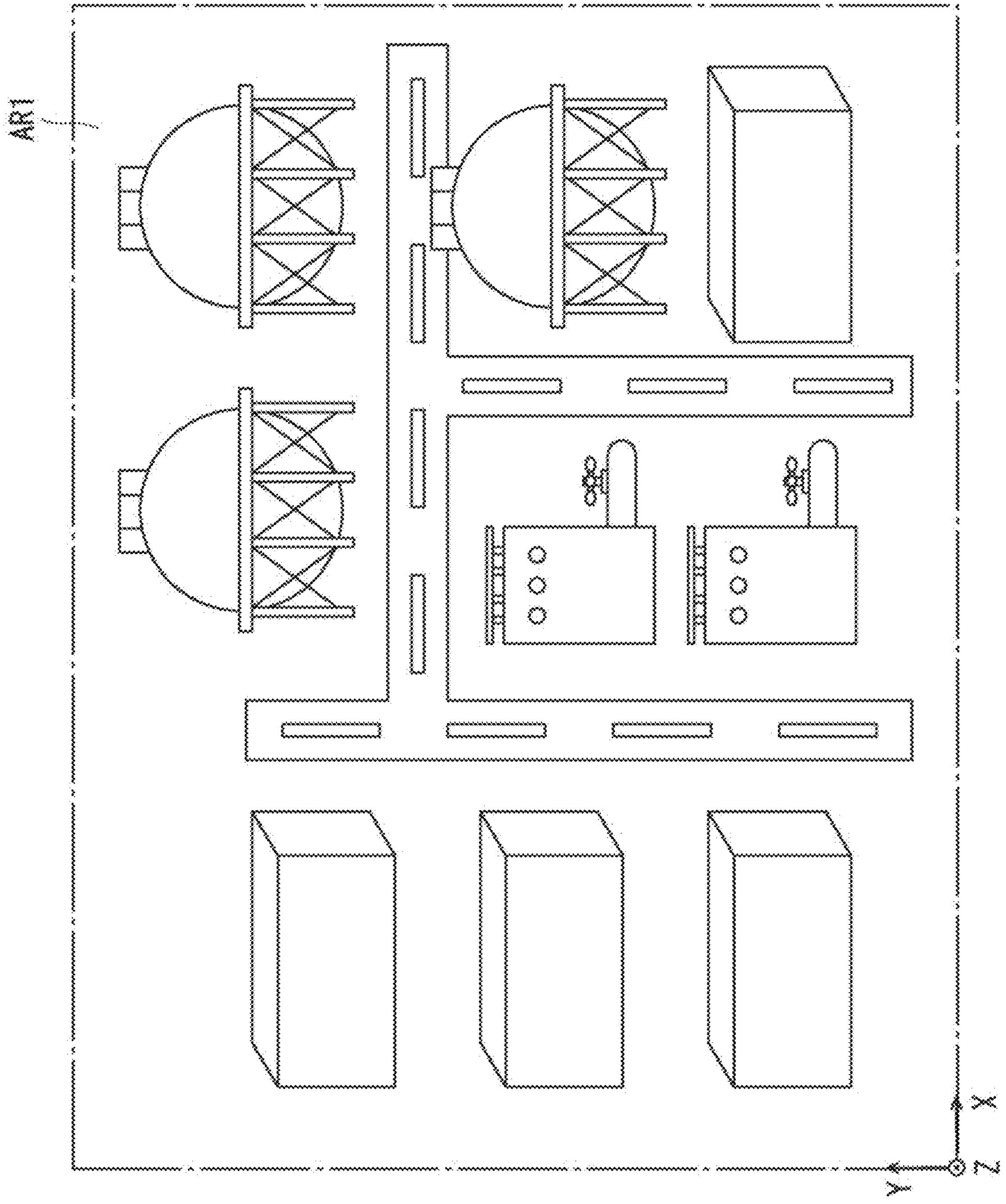
FIG. 5 is a diagram for describing a first area.
Figure 6:
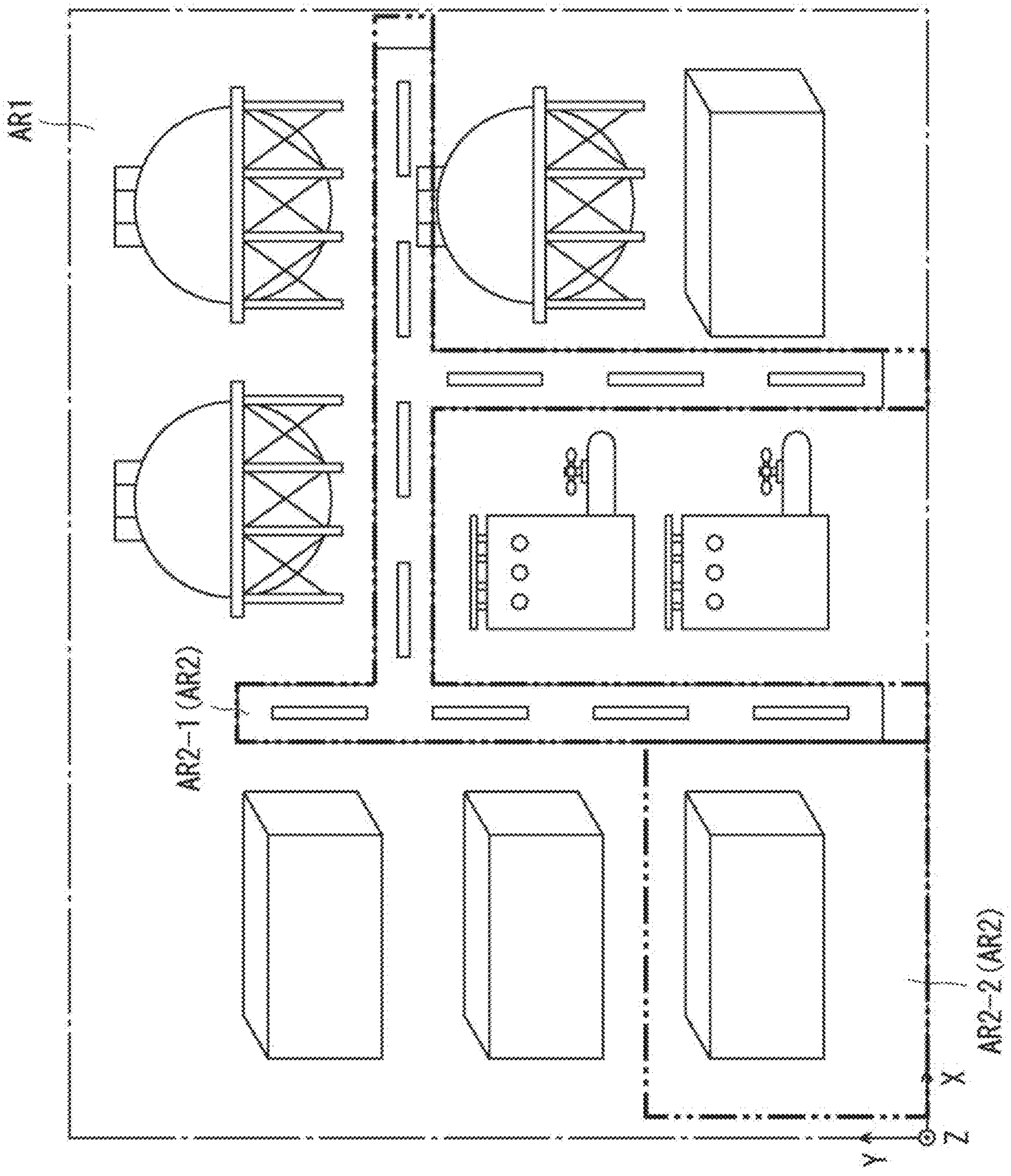
FIG. 6 is a diagram for describing a second area.

In the present example embodiment, an abnormality determination system including a more preferable abnormality determination apparatus and an abnormality determination method as compared with the abnormality determination apparatus 1 and the abnormality determination method according to the first example embodiment will be described. FIG. 3 is a block diagram illustrating a configuration of the abnormality determination system according to the present example embodiment. FIG. 4 is a block diagram illustrating a configuration of the abnormality determination apparatus according to the present example embodiment. FIG. 5 is a diagram for describing a first area. FIG. 6 is a diagram for describing a second area.

As illustrated in FIG. 3, an abnormality determination system 11 according to the present example embodiment includes an optical fiber sensor 12, a moving object 13, a mobile terminal 14, an abnormality determination apparatus 15, and a storage unit 16. The optical fiber sensor 12, the moving object 13, the mobile terminal 14, the abnormality determination apparatus 15, and the storage unit 16 are connected via a network 17. Here, the network 17 is, for example, the Internet, and is constructed by a telephone line network, a wireless communication path, Ethernet (registered trademark), or the like.

Similarly to a general optical fiber sensor, the optical fiber sensor 12 includes, for example, an optical fiber, a light source provided at one end portion of the optical fiber, and a light receiving element provided at the other end portion of the optical fiber, and the optical fiber is disposed in such a way as to surround the first area.

Such an optical fiber sensor 12 is configured to detect vibration, temperature, or sound of an object inside the first area, a position of the object, and the like as a state of the inside of the first area by detecting a change in characteristic of propagated light inside the optical fiber due to a change applied to the optical fiber. The optical fiber sensor 12 is not limited to a transmissive optical fiber sensor as described above, and a reflective optical fiber sensor can also be applied.

For example, the moving object 13 autonomously travels in the vicinity of a position of an object for which an abnormality is detected inside the first area based on information indicating a control instruction generated by a control unit 158 of the abnormality determination apparatus 15 described below. The moving object 13 includes a position detection unit 131 and a surrounding detection unit 132.

The position detection unit 131 includes, for example, a receiver that receives positioning information from a satellite positioning system such as a global positioning system (GPS), and the like, and detects a position of the moving object 13 inside the first area based on the received positioning information and map information of the first area. However, it is sufficient if the position detection unit 131 is configured to be able to detect the position of the moving object 13 inside the first area.

The surrounding detection unit 132 includes, for example, a camera, a light detection and ranging (LiDar), or the like. For example, the surrounding detection unit 132 detects a shape of an object around the moving object 13 and a distance to the object as a surrounding environment of the moving object 13. However, it is sufficient if the moving object 13 is configured to be movable in a planar region of the first area, and the moving object 13 may be, for example, a drone or a walking robot.

The mobile terminal 14 is a tablet personal computer (PC), a smartphone, or the like possessed by an inspector, and includes a setting unit 141 and a display unit 142. The setting unit 141 is an input unit that sets the first area, the second area, and an invalid time zone. However, it is sufficient if the setting unit 141 is configured to be able to set the first area, the second area, and the invalid time zone, and the setting unit 141 may be, for example, a keyboard of a PC.

The first area is an abnormality detection target region where abnormality detection is attempted by moving the moving object 13. For example, as illustrated in FIG. 5, a first area AR1 is set in a region including a facility such as a plant, and in FIG. 5, the first area AR1 is a region surrounded by a line with alternating long and short dashes. However, a planar shape of the first area AR1 is not limited to a rectangular shape, and may be a circular shape, an elliptical shape, or another polygonal shape.

The second area is an abnormality detection invalidated region where abnormality detection is invalidated when an abnormality is detected in the first area AR1. The second area is set in such a way that the optical fiber sensor 12 detects vibration or moving sound of the moving object 13 or vibration or noise of construction in the first area AR1, and it is not erroneously determined that an abnormality has occurred in the first area AR1.

For example, as illustrated in FIG. 6, the second area AR2 is set as an area where vibration and noise are generated due to a road on which the moving object 13 moves, construction, or the like inside the first area AR1, and is a region surrounded by a line with alternating long and two short dashes in FIG. 6.

That is, in FIG. 6, inside the first area AR1, an area where a road on which the moving object 13 moves is disposed is set as a second area AR2-1, and an area where vibration or noise of construction is generated is set as a second area AR2-2.

However, the second area AR2 may be set in such a way that it is not erroneously determined that an abnormality has occurred in the first area AR1 based on the vibration or moving sound of the moving object 13 or the vibration or noise of construction in the first area AR1.

At this time, the first area AR1 and the second area AR2 are preferably set as map information representing the first area AR1 and the second area AR2 using three-dimensional coordinates. For example, the first area AR1 and the second area AR2 can be set as map information represented by three-dimensional coordinates based on an XYZ coordinate system as illustrated in FIGS. 5 and 6. That is, the first area AR1 and the second area AR2 are preferably three-dimensional spaces.

The invalid time zone is a time zone from a time when invalidation of detection of an abnormality is started to a time when invalidation of detection of an abnormality is finished, when the abnormality is detected in the first area AR1. The invalid time zone can be set to, for example, a time zone in which the moving object 13 moves in the second area AR2-1 or a time zone in which construction or the like is performed in the second area AR2-2.

The display unit 142 is a display that displays information indicating the surrounding environment of the moving object 13. However, it is sufficient if the display unit 142 is able to display the information indicating the surrounding environment of the moving object 13, and the display unit 142 may be mounted on, for example, a smart glass worn by the inspector.

Since the abnormality determination apparatus 15 has a configuration substantially equal to that of the first example embodiment, an overlapping description is omitted. As illustrated in FIG. 4, the abnormality determination apparatus 15 includes a state information acquisition unit 151, a position information acquisition unit 152, a surrounding information acquisition unit 153, a route information acquisition unit 154, a map information acquisition unit 155, a time information acquisition unit 156, an invalidation information acquisition unit 157, the control unit 158, and a determination unit 159.

The state information acquisition unit 151 acquires, for example, vibration, temperature, or sound of an object inside the first area AR1 detected by the optical fiber sensor 12, information indicating the position of the object inside the first area AR1, and the like. The position information acquisition unit 152 acquires information indicating the position of the moving object 13 inside the first area AR1 detected by the position detection unit 131.

The surrounding information acquisition unit 153 acquires information indicating the surrounding environment of the moving object 13 detected by the surrounding detection unit 132. At this time, the information indicating the position of the detected object, the information indicating the position of the moving object 13, and the information indicating the surrounding environment of the moving object 13 are preferably information represented by three-dimensional coordinates corresponding to the map information of the first area AR1 and the second area AR2 represented by three-dimensional coordinates.

The map information acquisition unit 155 acquires the map information of the first area AR1. The time information acquisition unit 156 acquires current time information from, for example, a clock (not illustrated). The invalidation information acquisition unit 157 acquires the map information of the second area AR2 and information indicating the invalid time zone in which detection of an abnormality is ignored when the abnormality is detected in the first area AR1.

The control unit 158 generates the control instruction to move the moving object 13 to the vicinity of a position where an abnormality in the first area AR1 is detected (that is, a position of an object that is a source of the detected abnormality and emits vibration, temperature, or sound that matches preset abnormal vibration, abnormal temperature, or abnormal sound as described below) based on the map information of the first area AR1, the position information of the moving object 13, and the information indicating the position of the detected object, and controls the moving object 13 based on the control instruction. In the present example embodiment, the control unit 158 is included in the abnormality determination apparatus 15, but the control unit 158 may also be included in the moving object 13.

The determination unit 159 determines whether or not an abnormality is detected in the first area AR1 based on vibration, temperature, or sound of an object inside the first area AR1 detected by the optical fiber sensor 12 in the first area AR1, and information indicating the position of the object in the first area AR1.

Specifically, the determination unit 159 determines whether or not vibration, temperature, or sound of an object inside the first area AR1 detected by the optical fiber sensor 12 matches the preset abnormal vibration, abnormal temperature, or abnormal sound, and determines that an abnormality is detected in the first area AR1 when the vibration, temperature, or sound matches the abnormal vibration, abnormal temperature, or abnormal sound set in advance.

Then, when an abnormality is detected in the first area AR1, the determination unit 159 determines that no abnormality has occurred in the first area AR1 in a case where a position of an object that is a source of the detected abnormality is inside the second area AR2 and a time when the abnormality is detected is within the invalid time zone.

The storage unit 16 stores the map information of the first area AR1, the map information of the second area AR2, the information indicating the invalid time zone, and the information indicating the abnormal vibration, abnormal temperature, or abnormal sound.

Figure 7:
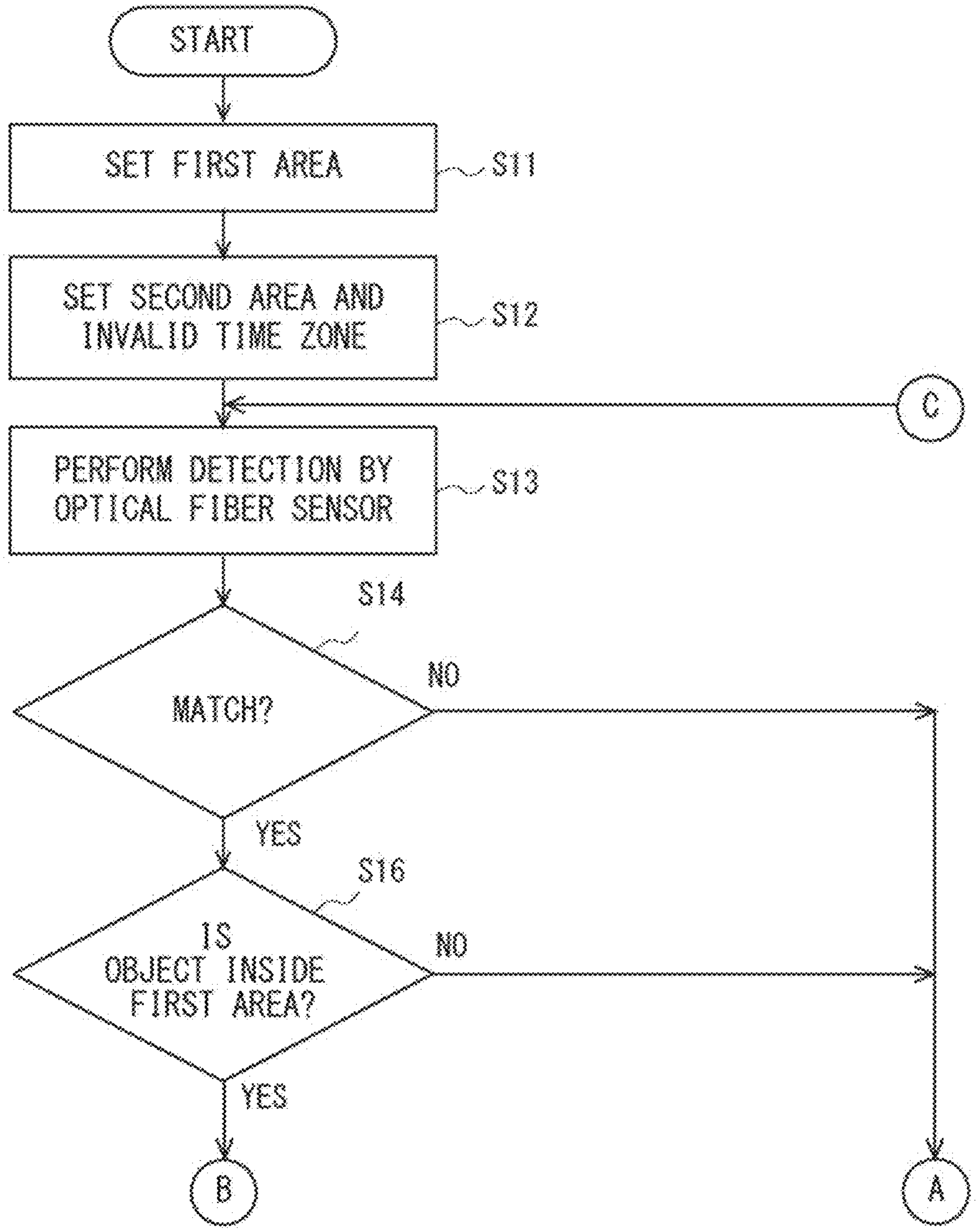
FIG. 7 is a flowchart illustrating a flow of an abnormality determination method according to the second example embodiment.
Figure 8:
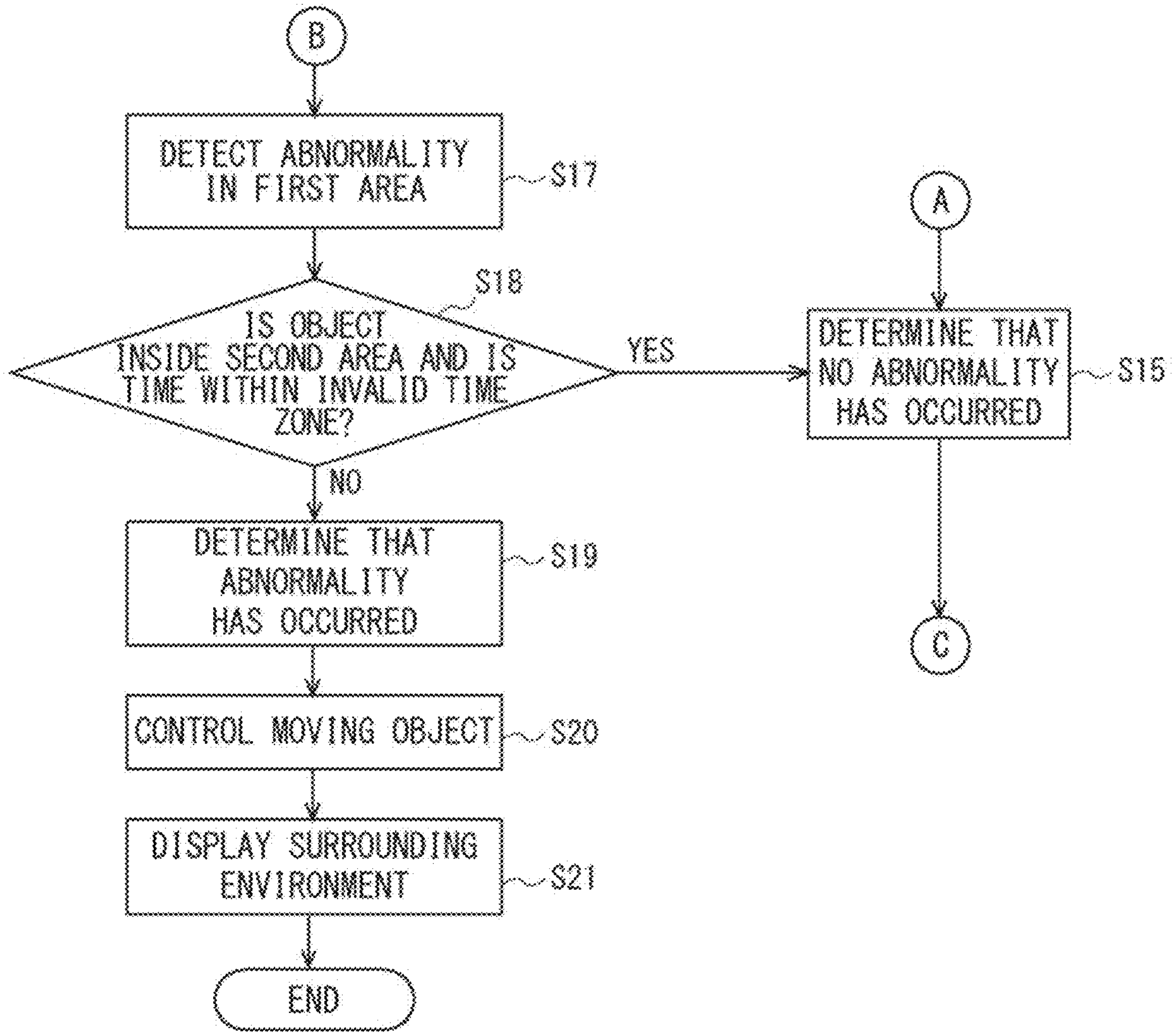
FIG. 8 is a flowchart illustrating a flow of the abnormality determination method according to the second example embodiment.

Next, a flow of an abnormality determination method according to the present example embodiment will be described. FIGS. 7 and 8 are flowcharts illustrating a flow of the abnormality determination method according to the present example embodiment. First, for example, the inspector sets the first area AR1 via the setting unit 141 of the mobile terminal 14 (S11). Then, the inspector sets the second area AR2 and the invalid time zone via the setting unit 141 of the mobile terminal 14 (S12).

Next, the state information acquisition unit 151 acquires vibration, temperature, or sound of an object inside the first area AR1, information indicating the position of the object inside the first area AR1, and the like by the optical fiber sensor 12 (S13).

Next, the determination unit 159 determines whether or not information indicating the vibration, temperature, or sound of the object detected by the optical fiber sensor 12 matches the preset abnormal vibration, abnormal temperature, or abnormal sound (S14). In a case where the vibration, temperature, or sound of the object does not match the abnormal vibration, abnormal temperature, or abnormal sound set in advance (NO in S14), the determination unit 159 determines that no abnormality has occurred in the first area AR1 (S15), and returns to the process of S13.

On the other hand, in a case where the vibration, temperature, or sound of the object matches the abnormal vibration, abnormal temperature, or abnormal sound set in advance (YES in S14), the determination unit 159 determines whether or not the object is present inside the first area AR1 based on the information indicating the position of the object that is the source of the detected abnormality and the map information of the first area AR1 (S16).

In a case where the object that is the source of the detected abnormality is not present inside the first area AR1 (NO in S16), the determination unit 159 determines that no abnormality has occurred in the first area AR1 (S15), and returns to the process of S13.

On the other hand, in a case where the object that is the source of the detected abnormality is present inside the first area AR1 (YES in S16), the determination unit 159 determines that the abnormality is detected in the first area AR1 (S17). At this time, the determination unit 159 preferably acquires time information indicating a time when the abnormality is detected in the first area AR1.

Next, the determination unit 159 determines whether or not the position of the object that is the source of the detected abnormality is inside the second area AR2 and the time when the abnormality is detected is within the invalid time zone based on the information indicating the position of the object that is the source of the detected abnormality, the map information of the second area AR2, the information indicating the invalid time zone, and the time information indicating the time when the abnormality is detected (S18).

In a case where the position of the object that is the source of the detected abnormality is inside the second area AR2 and the time when the abnormality is detected is within the invalid time zone (YES in S18), the determination unit 159 determines that no abnormality has occurred in the first area AR1 (S15), and returns to the process of S13.

On the other hand, in a case where the position of the object that is the source of the detected abnormality is not inside the second area AR2 or the time when the abnormality is detected is not within the invalid time zone (NO in S18), the determination unit 159 determines that the abnormality has occurred in the first area AR1 (S19).

Next, the control unit 158 generates the control instruction to move the moving object 13 to the vicinity of the position of the object based on the map information of the first area AR1, the position information of the moving object 13, and the information indicating the position of the object that is the source of the detected abnormality, and controls the moving object 13 based on the control instruction (S20). Then, the surrounding information acquisition unit 153 acquires information indicating the surrounding environment of the moving object 13 from the surrounding detection unit 132 of the moving object 13, and causes the display unit 142 of the mobile terminal 14 to display the information indicating the surrounding environment of the moving object 13 (S21).

As described above, also in the abnormality determination system 11, the abnormality determination apparatus 15, and the abnormality determination method according to the present example embodiment, occurrence of an abnormality in the first area AR1 is determined in consideration of not only a position where the abnormality is detected but also a time when the abnormality is detected. Therefore, as compared with the intrusion detection system of Patent Literature 1, it is possible to suppress erroneous abnormality determination and contribute to improvement of abnormality determination accuracy.

Moreover, since it is determined whether or not an abnormality is detected in the first area AR1, for example, erroneous determination based on noise (train sound or firework sound) outside the first area AR1 can be suppressed.

Furthermore, in a case where the first area AR1 and the second area AR2 are three-dimensional spaces represented by three-dimensional coordinates, for example, erroneous determination based on sound of an airplane flying above the second area AR2 or the like can be suppressed.

In addition, in a case where the information indicating the surrounding environment of the moving object 13 is displayed on the display unit 142 of the mobile terminal 14, the inspector can quickly confirm the object that is the source of the abnormality.

Third Example Embodiment

An abnormality determination system, an abnormality determination apparatus, and an abnormality determination method according to the present example embodiment are substantially equal to the abnormality determination system 11, the abnormality determination apparatus 15, and the abnormality determination method according to the second example embodiment, but are different in a method of setting a second area AR3. Therefore, an overlapping description will be omitted, and the same elements will be described using the same reference numerals.

Figure 9:
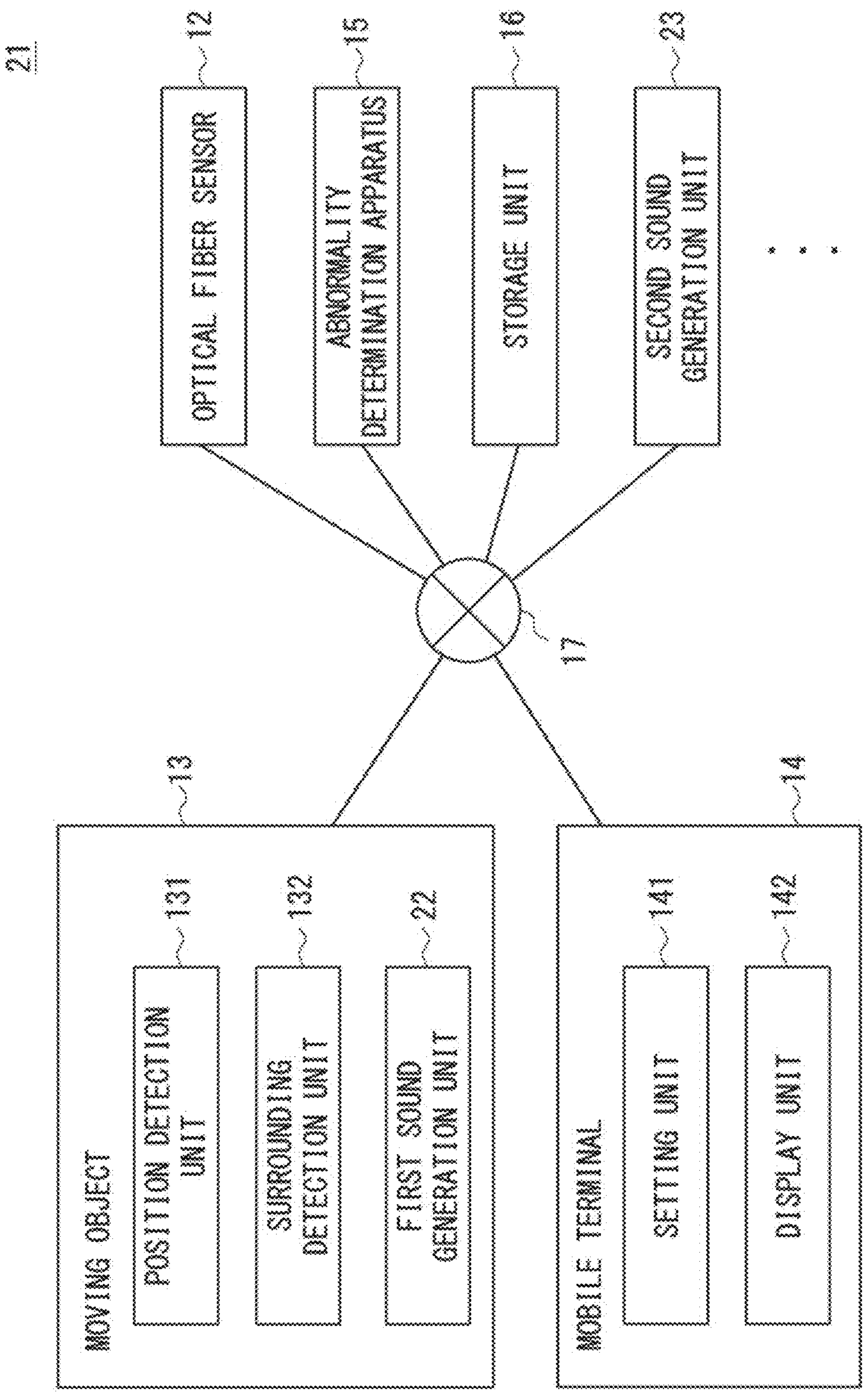
FIG. 9 is a block diagram illustrating a configuration of an abnormality determination system according to the third example embodiment.
Figure 10:
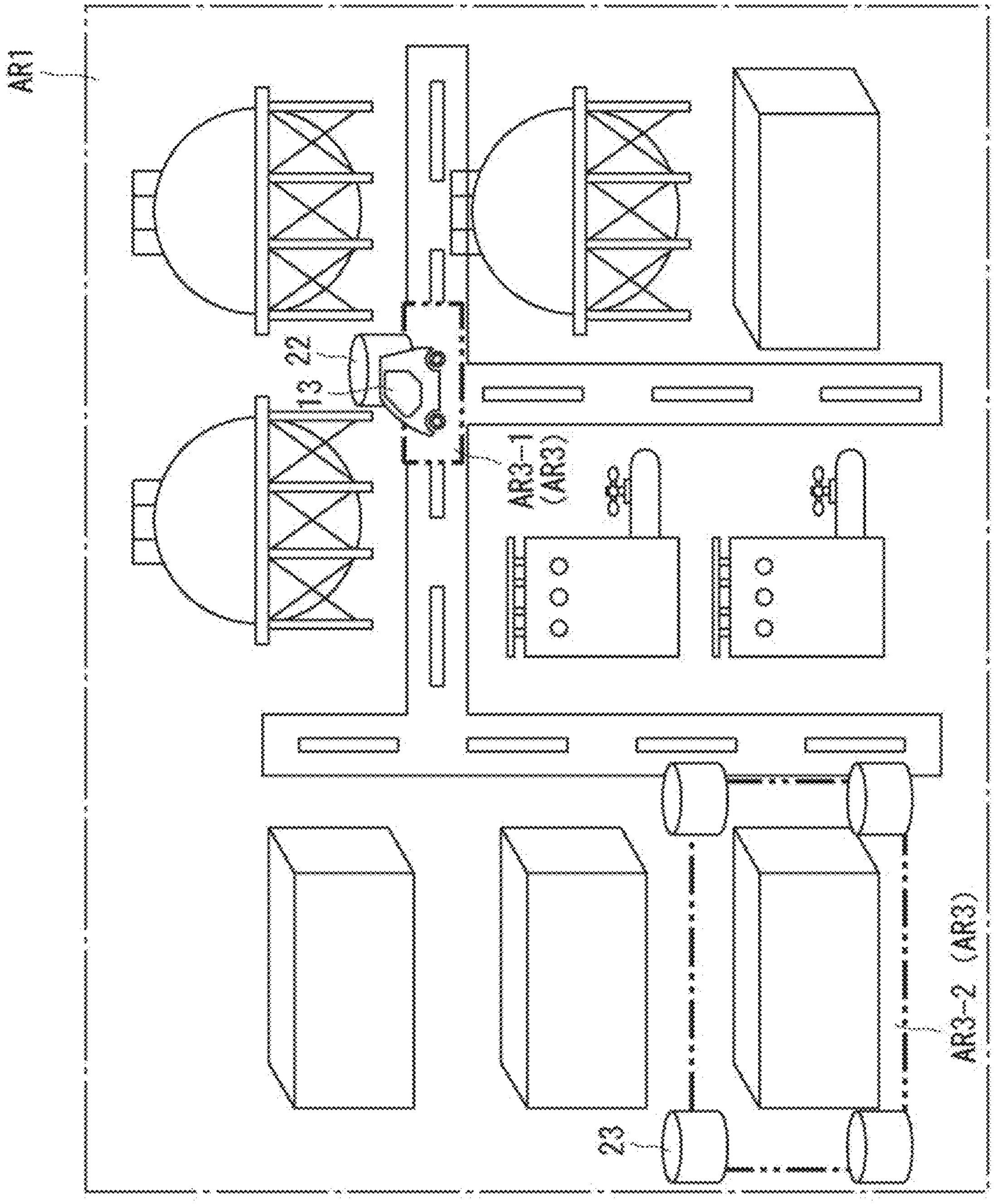
FIG. 10 is a diagram for describing a second area.

FIG. 9 is a block diagram illustrating a configuration of the abnormality determination system according to the present example embodiment. FIG. 10 is a diagram for describing the second area. As illustrated in FIG. 9, an abnormality determination system 21 according to the present example embodiment is different from the abnormality determination system 11 according to the second example embodiment in that the abnormality determination system 21 includes a first sound generation unit 22 and a second sound generation unit 23.

For example, as illustrated in FIG. 10, the first sound generation unit 22 is provided in a moving object 13 and generates sound of a preset first frequency. However, the first sound generation unit 22 may be provided, for example, in a vehicle or the like on which a visitor to a facility or the like rides, and it is sufficient if the first sound generation unit 22 is provided in an object that generates a moving sound or vibration when moving inside a first area AR1.

For example, as illustrated in FIG. 10, the second sound generation unit 23 is disposed in such a way as to surround an area where vibration or noise of scheduled construction or the like is generated, and generates sound of a preset second frequency. However, it is sufficient if the second sound generation unit 23 is disposed in such a way as to surround an abnormality detection invalidated area.

A setting unit 141 of a mobile terminal 14 is operated by an inspector in such a way that a preset area surrounding the moving object 13 in a case where a detection position of the sound of the first frequency emitted by the first sound generation unit 22 and a detection position of the moving sound of the moving object 13 detected by the optical fiber sensor 12 when the moving object 13 moves inside the first area AR1 substantially coincide with each other is set as a second area AR3-1.

In addition, the setting unit 141 of the mobile terminal 14 is operated by the inspector in such a way that an area surrounded by detection positions of the sounds of the second frequency emitted by a plurality of second sound generation units 23 and detected by the optical fiber sensor 12 is set as a second area AR3-2.

At this time, the storage unit 16 preferably stores information indicating the first frequency, information indicating the second frequency, information indicating a frequency of the moving sound of the moving object 13, and the like, in addition to map information of the first area AR1, map information of the second area AR3, information indicating an invalid time zone, and information indicating abnormal vibration, abnormal temperature, or abnormal sound.

In a case of determining occurrence of an abnormality in the first area AR1 by using the abnormality determination system 21, the abnormality determination can be performed in the same flow as the abnormality determination method according to the second example embodiment. At this time, when determining whether or not a position of an object for which an abnormality is detected is inside the second area AR3, even in a case where the moving sound of the moving object 13 coincides with a preset abnormal sound, the determination unit 159 determines that no abnormality has occurred in the first area AR1 since the preset area surrounding the moving object 13 in a case where the detection position of the sound of the first frequency emitted by the first sound generation unit 22 and the detection position of the moving sound of the moving object 13 substantially coincide with each other is set as the second area AR3-1.

Further, when determining whether or not a position of an object for which an abnormality is detected is inside the second area AR3, even in a case where noise of the object matches the preset abnormal sound, the determination unit 159 determines that no abnormality has occurred in the first area AR1 in a case where the object is inside the second area AR3-2 since the area surrounded by the detection positions of the sounds of the second frequency emitted by the plurality of second sound generation units 23 is set as the second area AR3-2.

By using the first sound generation unit 22 and the second sound generation unit 23 in this manner, an area where the moving sound of the moving object 13 is generated, an area where vibration or noise of construction is generated, and the like can be easily set as the second area AR3.

Another Example Embodiment

In the above-described first to third example embodiments, the present disclosure has been described as a hardware configuration, but the present disclosure is not limited thereto. The present disclosure can also be implemented by causing a central processing unit (CPU) to execute a computer program.

Figure 11:
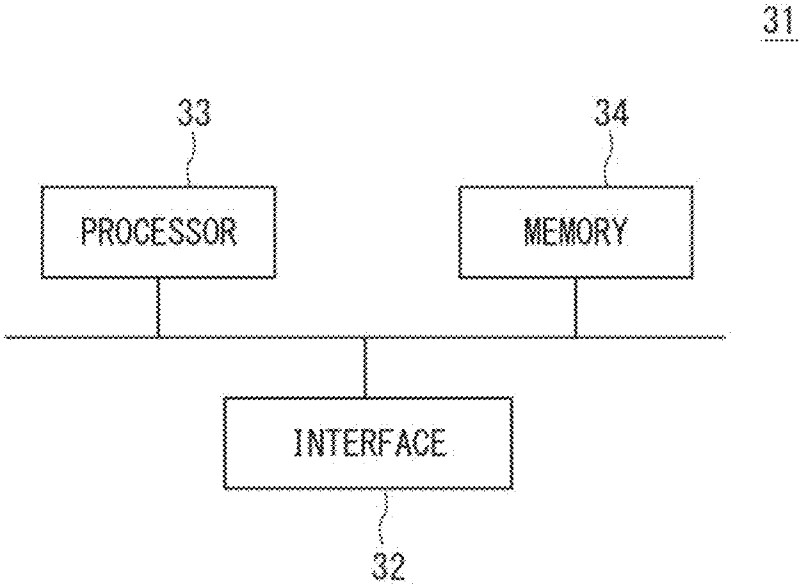
FIG. 11 is a diagram illustrating an example of a hardware configuration of the abnormality determination apparatus.

For example, the abnormality determination apparatus 15 according to the above-described example embodiment can have the following hardware configuration. FIG. 11 is a diagram illustrating an example of the hardware configuration of the abnormality determination apparatus 15.

An apparatus 31 illustrated in FIG. 11 includes a processor 33 and a memory 34 together with an interface 32. The abnormality determination apparatus 15 described in the above-described example embodiment is implemented by the processor 33 reading and executing a program stored in the memory 34. That is, the program is a program for causing the processor 33 to function as the abnormality determination apparatus 15.

Here, the program includes a group of instructions (or software codes) for causing a computer to perform one or more functions when the program is read by the computer. The program may be stored in a non-transitory computer-readable medium or a tangible storage medium. As an example and not by way of limitation, the computer-readable medium or the tangible storage medium includes a random-access memory (RAM), a read-only memory (ROM), a flash memory, a solid-state drive (SSD) or any other memory technology, a CD-ROM, a digital versatile disc (DVD), a Blu-ray (registered trademark) disc or any other optical disk storage, a magnetic cassette, a magnetic tape, a magnetic disk storage, and any other magnetic storage device. The program may be transmitted on a transitory computer-readable medium or a communication medium. As an example and not by way of limitation, the transitory computer-readable medium or the communication medium includes electrical, optical, acoustic, or other forms of propagated signals.

Note that the present disclosure is not limited to the above-described example embodiments, and can be appropriately modified without departing from the scope. In addition, the present disclosure may be implemented by appropriately combining the example embodiments.

For example, the moving object 13 according to the second example embodiment described above or the like is configured to autonomously travel, and may be configured to move according to an inspector's operation. Furthermore, the moving object 13 may be configured to patrol inside the first area AR1.

For example, the setting ranges and the setting methods for the second areas AR2 and AR3 in the second and third example embodiments described above are merely examples, and in short, it is sufficient if an area that causes erroneous determination of an abnormality inside the first area AR1 is excluded from the first area AR1.

Some or all of the above-described example embodiments may be described as the following supplementary notes but are not limited thereto.

Supplementary Note 1

An abnormality determination method including:
- setting a first area for an optical fiber sensor to attempt to detect an abnormality;
- setting a second area in which detection of an abnormality is invalidated when the abnormality is detected in the first area;
- setting an invalid time zone in which detection of an abnormality is invalidated when the abnormality is detected in the first area; and
- determining, when an abnormality is detected in the first area, that no abnormality has occurred in the first area in a case where a position where the abnormality is detected is inside the second area and a time when the abnormality is detected is within the invalid time zone.

Supplementary Note 2

The abnormality determination method according to Supplementary Note 1, in which the first area and the second area are set by using three-dimensional coordinates.

Supplementary Note 3

The abnormality determination method according to Supplementary Note 1 or 2, in which the second area is a preset area surrounding a moving object moving inside the first area in a case where a detection position of a sound of a preset first frequency emitted by first sound generation means provided in the moving object coincides with a detection position of moving sound of the moving object.

Supplementary Note 4

The abnormality determination method according to any one of Supplementary Notes 1 to 3, in which the second area is an area surrounded by detection positions of sounds of a preset second frequency emitted by a plurality of second sound generation means disposed inside the first area.

Supplementary Note 5

The abnormality determination method according to any one of Supplementary Notes 1 to 4, further including:
- acquiring position information of a moving object moving inside the first area;
- acquiring map information of the first area; and
- moving the moving object inside the first area based on the position information of the moving object, position information indicating the position where the abnormality is detected, and the map information of the first area to acquire surrounding environment information of the moving object.

Supplementary Note 6

A non-transitory computer-readable medium storing an abnormality determination program for causing a computer to execute processing of:
- setting a first area for an optical fiber sensor to attempt to detect an abnormality;
- setting a second area in which detection of an abnormality is invalidated when the abnormality is detected in the first area;
- setting an invalid time zone in which detection of an abnormality is invalidated when the abnormality is detected in the first area; and
- determining, when an abnormality is detected in the first area, that no abnormality has occurred in the first area in a case where a position where the abnormality is detected is inside the second area and a time when the abnormality is detected is within the invalid time zone.

Supplementary Note 7

An abnormality determination apparatus including:
- state information acquisition means for acquiring state information of an inside of a first area detected by an optical fiber sensor;

map information acquisition means for acquiring map information of the first area;

time information acquisition means for acquiring current time information;

invalidation information acquisition means for acquiring information indicating a second area in which detection of an abnormality is invalidated when the abnormality is detected in the first area and information indicating an invalid time zone in which detection of an abnormality is invalidated when the abnormality is detected in the first area; and determination means for determining whether or not an abnormality has occurred in the first area based on state information of the inside of the first area, in which when an abnormality is detected in the first area, the determination means determines that no abnormality has occurred in the first area in a case where a position where the abnormality is detected is inside the second area and a time when the abnormality is detected is within the invalid time zone.

Supplementary Note 8

The abnormality determination apparatus according to Supplementary Note 7, further including:

position information acquisition means for acquiring position information of a moving object moving inside the first area;

surrounding information acquisition means for acquiring surrounding environment information of the moving object; and control means for controlling the moving object based on the position information of the moving object, position information indicating a position where the abnormality is detected, and the map information of the first area.

Supplementary Note 9

An abnormality determination system including:

the abnormality determination apparatus according to Supplementary Note 7 or 8;

the optical fiber sensor disposed in such a way as to surround the first area; and setting means for setting the first area, the second area, and the invalid time zone.

Supplementary Note 10

The abnormality determination system according to Supplementary Note 9, further including first sound generation means for generating sound of a preset first frequency, the first sound generation means being provided in a moving object moving inside the first area, in which the setting means sets, as the second area, a preset area surrounding the moving object in a case where a detection position of the sound of the first frequency emitted by the first sound generation means coincides with a detection position of moving sound of the moving object when the moving object moves inside the first area.

Supplementary Note 11

The abnormality determination system according to Supplementary Note 10, further including:

surrounding detection means for detecting a surrounding environment of the moving object, the surrounding detection means being provided in the moving object; and display means for displaying information indicating the surrounding environment of the moving object.

Supplementary Note 12

The abnormality determination system according to any one of Supplementary Notes 9 to 11, further including a plurality of second sound generation means for generating sounds of a preset second frequency, the plurality of second sound generation means being disposed inside the first area, in which the setting means sets, as the second area, an area surrounded by detection positions of the sounds of the second frequency emitted by the plurality of second sound generation means.

REFERENCE SIGNS LIST

1 ABNORMALITY DETERMINATION APPARATUS
2 STATE INFORMATION ACQUISITION UNIT
3 MAP INFORMATION ACQUISITION UNIT
4 TIME INFORMATION ACQUISITION UNIT
5 INVALIDATION INFORMATION ACQUISITION UNIT
6 DETERMINATION UNIT
11 ABNORMALITY DETERMINATION SYSTEM
12 OPTICAL FIBER SENSOR
13 MOVING OBJECT
131 POSITION DETECTION UNIT
132 SURROUNDING DETECTION UNIT
14 MOBILE TERMINAL
141 SETTING UNIT
142 DISPLAY UNIT
15 ABNORMALITY DETERMINATION APPARATUS
151 STATE INFORMATION ACQUISITION UNIT
152 POSITION INFORMATION ACQUISITION UNIT
153 SURROUNDING INFORMATION ACQUISITION UNIT
154 ROUTE INFORMATION ACQUISITION UNIT
155 MAP INFORMATION ACQUISITION UNIT
156 TIME INFORMATION ACQUISITION UNIT
157 INVALIDATION INFORMATION ACQUISITION UNIT
158 CONTROL UNIT
159 DETERMINATION UNIT
16 STORAGE UNIT
17 NETWORK
21 ABNORMALITY DETERMINATION SYSTEM
22 FIRST SOUND GENERATION UNIT
23 SECOND SOUND GENERATION UNIT
31 APPARATUS
32 INTERFACE
33 PROCESSOR
34 MEMORY
AR1 FIRST AREA
AR2 (AR2-1, AR2-2), AR3 (AR3-1, AR3-2) SECOND AREA

What is claimed is:

1. An abnormality determination method comprising:

setting a first area for an optical fiber sensor to detect an abnormality;

setting a second area in which detection of the abnormality is invalidated when the abnormality is detected in the first area;

setting an invalid time period in which detection of the abnormality is invalidated when the abnormality is detected in the first area; and determining, when the abnormality is detected in the first area, that no abnormality has occurred in the first area in a case where a position where the abnormality is detected is inside the second area and a time when the abnormality is detected is within the invalid time period, wherein the second area is a preset area surrounding a moving object moving inside the first area in a case where a detection position of a sound of a preset first frequency emitted by a first speaker provided in the moving object coincides with a detection position of a moving sound of the moving object.

2. The abnormality determination method according to claim 1, wherein the first area and the second area are set by using three-dimensional coordinates.

3. The abnormality determination method according to claim 1, wherein the second area is an area surrounded by detection positions of sounds of a preset second frequency emitted by a plurality of second speakers disposed inside the first area.

4. The abnormality determination method according to claim 1, further comprising:

acquiring position information of the moving object moving inside the first area;

acquiring map information of the first area; and moving the moving object inside the first area based on the position information of the moving object, position information indicating the position where the abnormality is detected, and the map information of the first area to acquire surrounding environment information of the moving object.

5. A non-transitory computer-readable medium storing an abnormality determination program for causing a computer to execute processing of:

setting a first area for an optical fiber sensor to detect an abnormality;

setting a second area in which detection of the abnormality is invalidated when the abnormality is detected in the first area, the second area being an area surrounded by detection positions of sounds of a preset frequency emitted by a plurality of speakers disposed inside the first area;

setting an invalid time period in which detection of the abnormality is invalidated when the abnormality is detected in the first area; and determining, when the abnormality is detected in the first area, that no abnormality has occurred in the first area in a case where a position where the abnormality is detected is inside the second area and a time when the abnormality is detected is within the invalid time period.

6. An abnormality determination apparatus comprising:

at least one memory for storing instructions; and at least one processor configured to execute the instructions to:

acquire state information of an inside of a first area detected by an optical fiber sensor;

acquire map information of the first area;

acquire current time information;

acquire information indicating a second area in which detection of an abnormality is invalidated when the abnormality is detected in the first area and information indicating an invalid time period in which detection of the abnormality is invalidated when the abnormality is detected in the first area;

determine whether or not the abnormality has occurred in the first area based on state information of the inside of the first area; and determine, when the abnormality is detected in the first area, that no abnormality has occurred in the first area in a case where a position where the abnormality is detected is inside the second area and a time when the abnormality is detected is within the invalid time period, wherein the second area is a preset area surrounding a moving object moving inside the first area in a case where a detection position of a sound of a preset first frequency emitted by a first speaker provided in the moving object coincides with a detection position of a moving sound of the moving object.

7. The abnormality determination apparatus according to claim 6, wherein the at least one processor is further configured to execute the instructions to:

acquire position information of the moving object moving inside the first area;

acquire surrounding environment information of the moving object; and control the moving object based on the position information of the moving object, position information indicating the position where the abnormality is detected, and the map information of the first area.

8. An abnormality determination system comprising:

the abnormality determination apparatus according to claim 6;

the optical fiber sensor disposed in such a way as to surround the first area;

a mobile terminal configured to set the first area, the second area, and the invalid time period; and the first speaker, wherein the mobile terminal sets, as the second area, a preset area surrounding the moving object in a case where, when the moving object moves inside the first area, a detection position of the sound of the first frequency emitted by the first speaker coincides with a detection position of a moving sound of the moving object.

9. The abnormality determination system according to claim 8, further comprising:

a camera or a LiDar configured to detect a surrounding environment of the moving object, the camera or the LiDar being provided in the moving object; and a display configured to display information indicating the surrounding environment of the moving object.

10. The abnormality determination system according to claim 8, further comprising a plurality of second speakers configured to generate sounds of a preset second frequency, the plurality of second speakers being disposed inside the first area, wherein the mobile terminal sets, as the second area, an area surrounded by detection positions of the sounds of the second frequency emitted by the plurality of second speakers.

* * * * *